United States Patent
Weder

(10) Patent No.: US 6,634,137 B2
(45) Date of Patent: *Oct. 21, 2003

(54) FLORAL SLEEVE HAVING AN EXTENDABLE SKIRT AND METHODS

(75) Inventor: Donald E. Weder, Highland, IL (US)

(73) Assignee: Southpac Trust International, Inc.

( * ) Notice: Subject to any disclaimer, the term of this patent is extended or adjusted under 35 U.S.C. 154(b) by 235 days.

This patent is subject to a terminal disclaimer.

(21) Appl. No.: 10/084,743

(22) Filed: Feb. 20, 2002

(65) Prior Publication Data

US 2002/0078627 A1 Jun. 27, 2002

Related U.S. Application Data

(63) Continuation of application No. 09/929,699, filed on Aug. 14, 2001, now Pat. No. 6,354,040, which is a continuation of application No. 09/615,562, filed on Jul. 13, 2000, now Pat. No. 6,298,602, which is a continuation of application No. 09/064,460, filed on Apr. 22, 1998, now Pat. No. 6,151,830, which is a continuation-in-part of application No. 08/788,616, filed on Jan. 27, 1997, now Pat. No. 5,749,171, which is a continuation-in-part of application No. 08/237,078, filed on May 3, 1994, now Pat. No. 5,625,979, which is a continuation-in-part of application No. 08/220,852, filed on Mar. 31, 1994, now Pat. No. 5,572,851.

(51) Int. Cl.$^7$ .................................................. A01G 9/02
(52) U.S. Cl. ............................................................ 47/72
(58) Field of Search ................................. 47/72; 53/397

(56) References Cited

U.S. PATENT DOCUMENTS

| | | |
|---|---|---|
| 524,219 A | 8/1894 | Schmidt |
| 732,889 A | 7/1903 | Paver |
| 950,785 A | 3/1910 | Pene |
| 1,063,154 A | 5/1913 | Bergen |
| 1,446,563 A | 2/1923 | Hughes |
| 1,520,647 A | 12/1924 | Hennigan |
| 1,525,015 A | 2/1925 | Weeks |
| 1,610,652 A | 12/1926 | Bouchard |
| 1,697,751 A | 1/1929 | Blake ........................... 229/87 |
| 1,863,216 A | 6/1932 | Wordingham |
| 1,978,631 A | 10/1934 | Herrlinger ..................... 91/68 |
| 2,048,123 A | 7/1936 | Howard ....................... 229/87 |
| RE21,065 E | 5/1939 | Copeman ......................... 93/2 |
| 2,170,147 A | 8/1939 | Lane ........................... 206/56 |
| 2,200,111 A | 5/1940 | Bensel ....................... 229/1.5 |
| 2,278,673 A | 4/1942 | Savada et al. ................ 154/43 |

(List continued on next page.)

FOREIGN PATENT DOCUMENTS

| | | |
|---|---|---|
| AU | 4231978 | 6/1779 |
| BE | 654427 | 1/1965 |

(List continued on next page.)

OTHER PUBLICATIONS

Speed Cover Brochure, "The Simple Solution For Those Peak Volume Periods", Highland Supply Corporation, ©1989.

"Speed Sheets and Speed Rolls" Brochure, Highland Supply Corporation, ©1990.

(List continued on next page.)

*Primary Examiner*—Charles T. Jordan
*Assistant Examiner*—Francis T. Palo
(74) *Attorney, Agent, or Firm*—Dunlap, Codding & Rogers, P.C.

(57) ABSTRACT

A plant packaging and covering system comprising a floral sleeve having a base portion and skirt portion. The sleeve may have an upper protective sleeve portion which can surround a plant disposed in a pot and which can be detached once the protective function of the sleeve has been completed thereby allowing the skirt portion to extend angularly from the base portion. The sleeve has a plurality of folds comprising expansion for allowing portions of the base portion to expand, and portions of the skirt portion to extend angularly, when a pot is disposed within the sleeve.

23 Claims, 7 Drawing Sheets

U.S. PATENT DOCUMENTS

| | | | |
|---|---|---|---|
| 2,302,289 A | 11/1942 | Rothfuss | 41/10 |
| 2,323,287 A | 7/1943 | Amberg | 229/53 |
| 2,355,559 A | 8/1944 | Renner | 229/8 |
| 2,371,985 A | 3/1945 | Freiberg | 206/46 |
| 2,411,328 A | 11/1946 | MacNab | 33/12 |
| 2,510,120 A | 6/1950 | Leander | 117/122 |
| 2,529,060 A | 11/1950 | Trillich | 117/68.5 |
| 2,621,142 A | 12/1952 | Wetherell | 154/117 |
| 2,648,487 A | 8/1953 | Linda | 229/55 |
| 2,688,354 A | 9/1954 | Berger | 150/28 |
| 2,774,187 A | 12/1956 | Smithers | 47/41 |
| 2,822,287 A | 2/1958 | Avery | 117/14 |
| 2,846,060 A | 8/1958 | Yount | 206/58 |
| 2,850,842 A | 9/1958 | Eubank, Jr. | 47/58 |
| 2,883,262 A | 4/1959 | Borin | 21/56 |
| 2,989,828 A | 6/1961 | Warp | 53/390 |
| 3,022,605 A | 2/1962 | Reynolds | 47/58 |
| 3,080,680 A | 3/1963 | Reynolds | 47/37 |
| 3,094,810 A | 6/1963 | Kalpin | 47/37 |
| 3,121,647 A | 2/1964 | Harris et al. | 118/202 |
| 3,130,113 A | 4/1964 | Silman | 161/97 |
| 3,271,922 A | 9/1966 | Wallerstein et al. | 53/3 |
| 3,322,325 A | 5/1967 | Bush | 229/62 |
| 3,376,666 A | 4/1968 | Leonard | 47/41 |
| 3,380,646 A | 4/1968 | Doyen et al. | 229/57 |
| 3,431,706 A | 3/1969 | Stuck | 53/390 |
| 3,508,372 A | 4/1970 | Wallerstein et al. | 53/3 |
| 3,510,054 A | 5/1970 | Sanni et al. | 229/66 |
| 3,512,700 A | 5/1970 | Evans et al. | 229/53 |
| 3,552,059 A | 1/1971 | Moore | 47/41.12 |
| 3,554,434 A | 1/1971 | Anderson | 229/55 |
| 3,556,389 A | 1/1971 | Gregoire | 229/53 |
| 3,557,516 A | 1/1971 | Brandt | 53/14 |
| 3,620,366 A | 11/1971 | Parkinson | 206/59 |
| 3,681,105 A | 8/1972 | Milutin | 117/15 |
| 3,767,104 A | 10/1973 | Bachman et al. | 229/7 |
| 3,793,799 A | 2/1974 | Howe | 53/32 |
| 3,869,828 A | 3/1975 | Matsumoto | 47/34.11 |
| 3,888,443 A | 6/1975 | Flanigen | 248/152 |
| 3,962,503 A | 6/1976 | Crawford | 428/40 |
| 4,043,077 A | 8/1977 | Stonehocker | 47/66 |
| 4,054,697 A | 10/1977 | Reed et al. | 428/40 |
| 4,091,925 A | 5/1978 | Griffo et al. | 206/423 |
| 4,113,100 A | 9/1978 | Soja et al. | 206/602 |
| 4,118,890 A | 10/1978 | Shore | 47/28 |
| 4,189,868 A | 2/1980 | Tymchuck et al. | 47/84 |
| 4,216,620 A | 8/1980 | Weder et al. | 47/72 |
| 4,248,347 A | 2/1981 | Trimbee | 206/423 |
| D259,243 S | 5/1981 | Charbonneau | D9/306 |
| 4,265,049 A | 5/1981 | Gorewitz | 47/26 |
| 4,280,314 A | 7/1981 | Stuck | 53/241 |
| 4,297,811 A | 11/1981 | Weder | 47/72 |
| 4,333,267 A | 6/1982 | Witte | 47/84 |
| 4,347,686 A | 9/1982 | Wood | 47/73 |
| 4,380,564 A | 4/1983 | Cancio et al. | 428/167 |
| 4,400,910 A | 8/1983 | Koudstall et al. | 47/84 |
| 4,413,725 A | 11/1983 | Bruno et al. | 206/45.33 |
| D279,279 S | 6/1985 | Wagner | D11/143 |
| 4,546,875 A | 10/1985 | Zweber | 206/0.82 |
| 4,621,733 A | 11/1986 | Harris | 206/423 |
| 4,640,078 A | 2/1987 | Stuck | 53/390 |
| 4,717,262 A | 1/1988 | Roen et al. | 383/120 |
| 4,733,521 A | 3/1988 | Weder et al. | 53/580 |
| 4,765,464 A | 8/1988 | Ristvedt | 206/0.82 |
| 4,771,573 A | 9/1988 | Stengel | 47/67 |
| 4,773,182 A | 9/1988 | Weder et al. | 47/72 |
| 4,801,014 A | 1/1989 | Meadows | 206/423 |
| 4,810,109 A | 3/1989 | Castel | 383/105 |
| 4,835,834 A | 6/1989 | Weder | 29/525 |
| D301,991 S | 7/1989 | Van Sant | D11/149 |
| 4,941,572 A | 7/1990 | Harris | 206/423 |
| 4,980,209 A | 12/1990 | Hill | 428/34.1 |
| 5,029,412 A | 7/1991 | Weder et al. | 47/72 |
| 5,073,161 A | 12/1991 | Weder et al. | 493/154 |
| 5,074,675 A | 12/1991 | Osgood | 383/122 |
| 5,105,599 A | 4/1992 | Weder | 53/399 |
| 5,111,638 A | 5/1992 | Weder | 53/397 |
| 5,120,382 A | 6/1992 | Weder | 156/212 |
| 5,152,100 A | 10/1992 | Weder et al. | 47/72 |
| 5,181,364 A | 1/1993 | Weder | 53/397 |
| D335,105 S | 4/1993 | Ottenwalder et al. | D11/164 |
| 5,199,242 A | 4/1993 | Weder et al. | 53/397 |
| 5,205,108 A | 4/1993 | Weder et al. | 53/397 |
| 5,228,234 A | 7/1993 | de Klerk et al. | 47/41.01 |
| 5,235,782 A | 8/1993 | Landau | 47/72 |
| 5,239,775 A | 8/1993 | Landau | 47/72 |
| 5,249,407 A | 10/1993 | Stuck | 53/399 |
| 5,259,106 A | 11/1993 | Weder et al. | 29/469.5 |
| 5,307,606 A | 5/1994 | Weder | 53/410 |
| 5,315,785 A | 5/1994 | Avôt et al. | 47/72 |
| 5,350,240 A | 9/1994 | Billman et al. | 383/104 |
| 5,353,575 A | 10/1994 | Stepanek | 53/461 |
| 5,361,482 A | 11/1994 | Weder et al. | 29/469 |
| 5,388,695 A | 2/1995 | Gilbert | 206/423 |
| 5,428,939 A | 7/1995 | Weder et al. | 53/397 |
| 5,443,670 A | 8/1995 | Landau | 156/191 |
| 5,493,809 A | 2/1996 | Weder et al. | 47/72 |
| D368,025 S | 3/1996 | Sekerak et al. | D9/305 |
| 5,496,251 A | 3/1996 | Cheng | 493/224 |
| 5,496,252 A | 3/1996 | Gilbert | 493/224 |
| 5,526,932 A | 6/1996 | Weder | 206/423 |
| 5,572,849 A | 11/1996 | Weder et al. | 53/397 |
| 5,572,851 A | 11/1996 | Weder | 53/399 |
| 5,575,133 A | 11/1996 | Weder et al. | 53/397 |
| 5,617,703 A | 4/1997 | Weder | 53/413 |
| 5,624,320 A | 4/1997 | Martinez | 472/51 |
| 5,625,979 A | 5/1997 | Weder | 47/72 |
| 5,647,168 A | 7/1997 | Gilbert | 47/72 |
| 5,749,171 A | 5/1998 | Weder | 47/72 |
| 6,151,830 A | 11/2000 | Weder | 47/72 |
| 6,298,602 B1 | 10/2001 | Weder | 47/72 |

FOREIGN PATENT DOCUMENTS

| | | | |
|---|---|---|---|
| CH | 560532 | 4/1975 | |
| DE | 345464 | 12/1921 | |
| DE | 513971 | 11/1930 | |
| DE | 1166692 | 3/1964 | |
| DE | 4962947 | 6/1971 | |
| DE | 2060812 | 11/1971 | |
| DE | 2748626 | 5/1979 | |
| DE | 3445799 | 6/1986 | |
| DE | 3829281 | 5/1989 | |
| DE | 3911847 | 10/1990 | 47/72 |
| EP | 0050990 | 5/1982 | |
| EP | 0791543 | 8/1997 | |
| FR | 1376047 | 9/1964 | |
| FR | 2036163 | 12/1970 | |
| FR | 2137325 | 12/1972 | |
| FR | 2272914 | 12/1975 | |
| FR | 2489126 | 3/1982 | |
| FR | 2610604 | 8/1988 | |
| FR | 2603159 | 3/1989 | |
| FR | 2619698 | 3/1989 | |
| GB | 5605 | of 1885 | |
| GB | 1204647 | 9/1970 | |
| GB | 2056410 | 3/1981 | |
| GB | 2074542 | 11/1981 | |
| GB | 2128083 | 4/1984 | |
| GB | 2252708 | 8/1992 | |
| IT | 224507 | 4/1996 | |
| JP | 542958 | 2/1993 | |

NL    8301709    12/1984
NL    1000658    6/1995
WO    9315979    8/1993

OTHER PUBLICATIONS

"Color Them Happy with Highlander Products" ©1992.
"Costa Keeps the Christmas Spirit", Supermarket Floral, Sep. 15, 1992.
"Super Seller", Supermarket Floral, Sep. 15, 1992.
"Halloween", Link Magazine, Sep. 1992, 2 pages.
"Now More Than Ever", Supermarket Floral, Sep. 15, 1992.
Le Plant Sac Advertisement, published prior to Sep. 26, 1987.
"A World of Cut Flower and Pot Plant Packaging" Brochure, Klerk's Plastic Products Manufacturing, Inc., Date unknown, 6 pages.

Chantler & Chantler brochure showing Zipper Sleeve and Florasheet®, Date unknown, 2 pages.

"Foil Jackets" brochure, Custom Medallion, Inc., Date unknown, 2 pages.

"Silver Lings" Brochure, Affinity Diversified Industries, Inc., 1986. The Silver Linings brochure shows a floral sleeve with a closed bottom. The brochure shows, in one embodimetn, a vase with flowers inside a "cut flower" sleeve with the sleeve tied with a ribbon about the neck of the vase.

"Derwent Abstract" of FR 2610604A. It is noted thath the abstract is an incorrect English translation of the contents of the French patent. The French patent does not enable or disclose adhesively attaching the covering to the container, 1988.

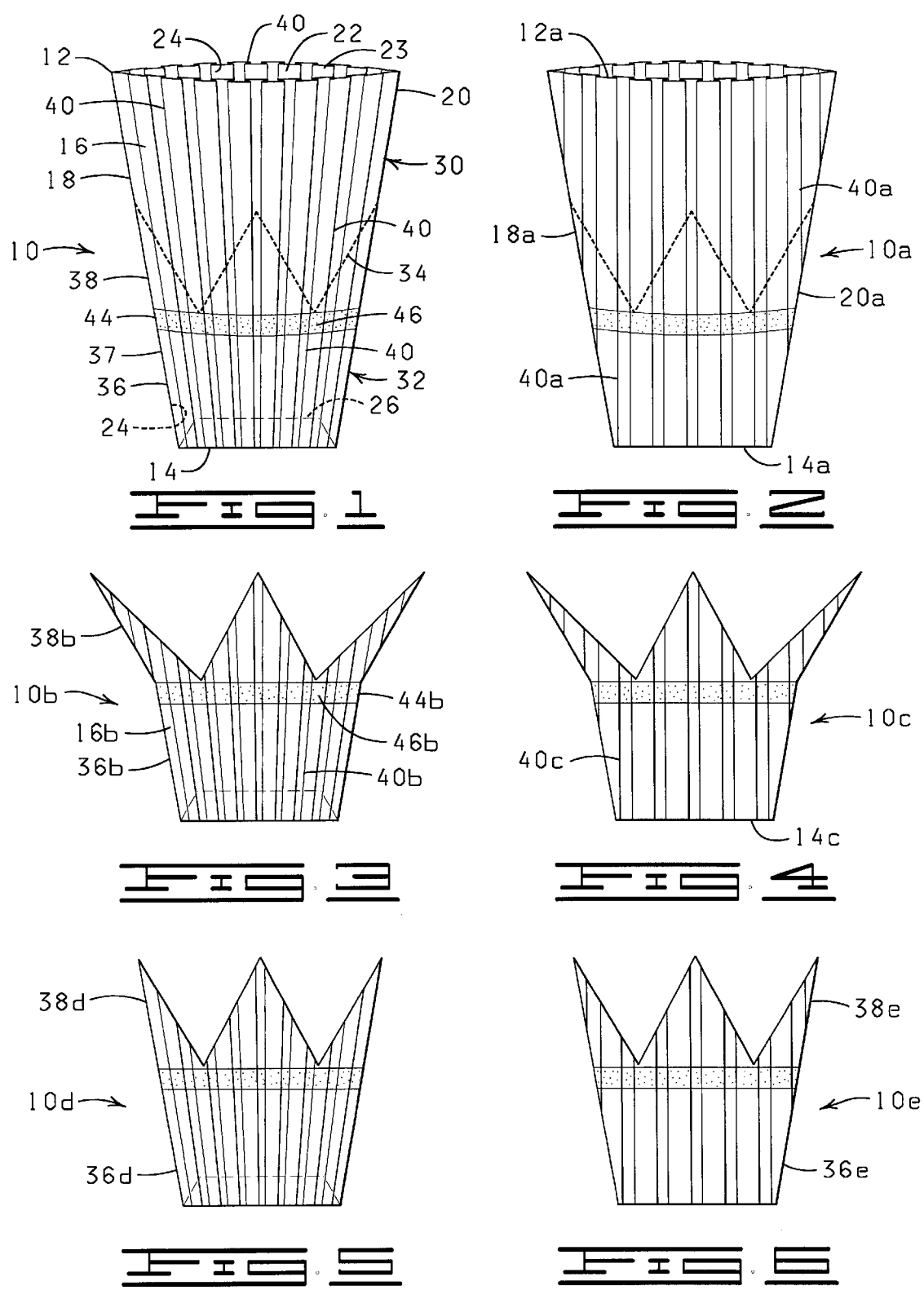

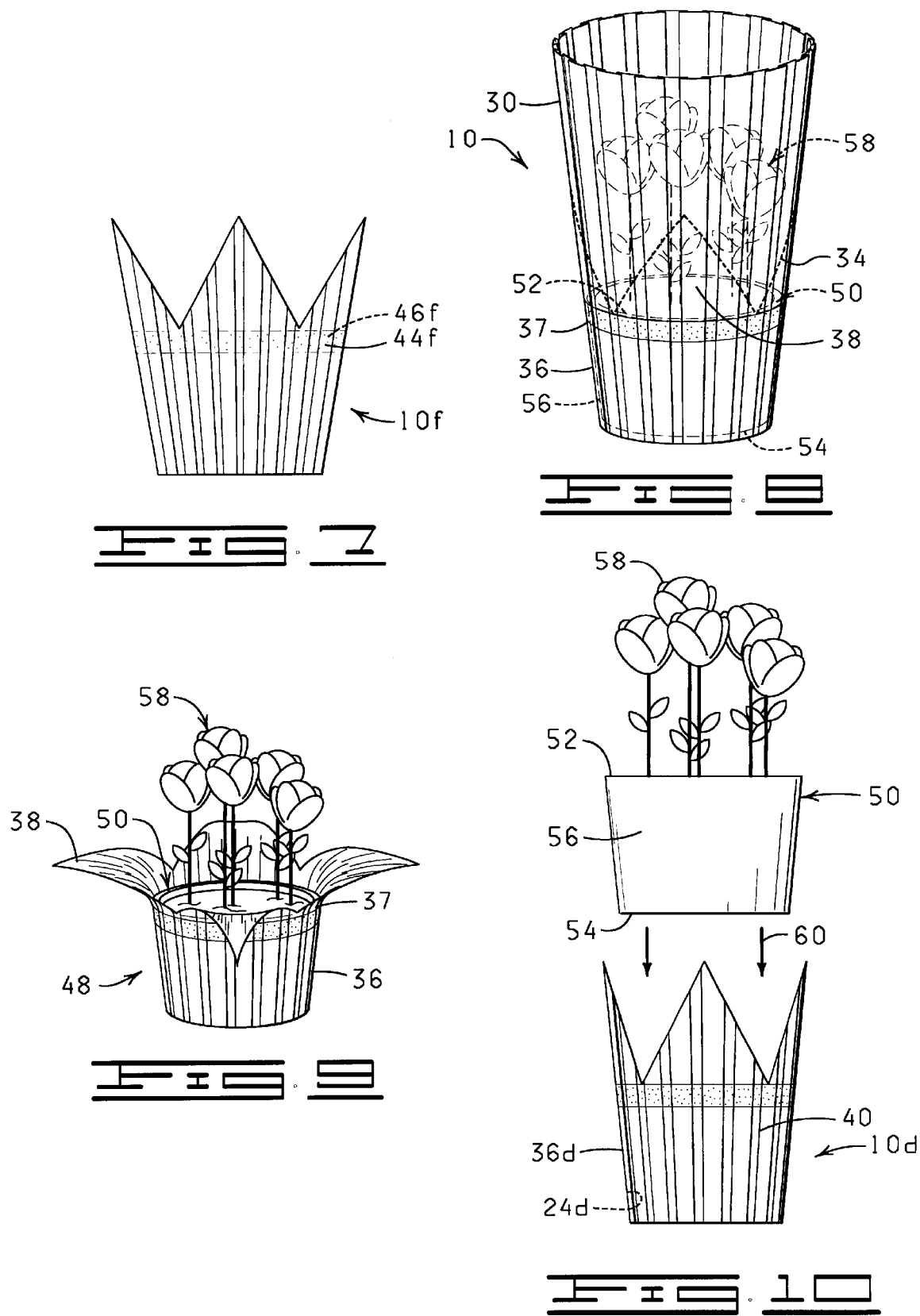

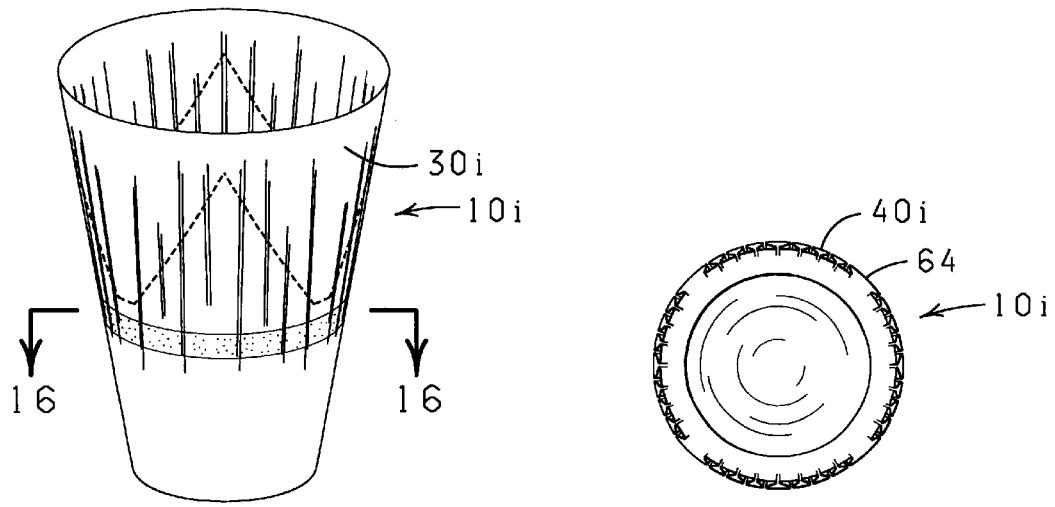
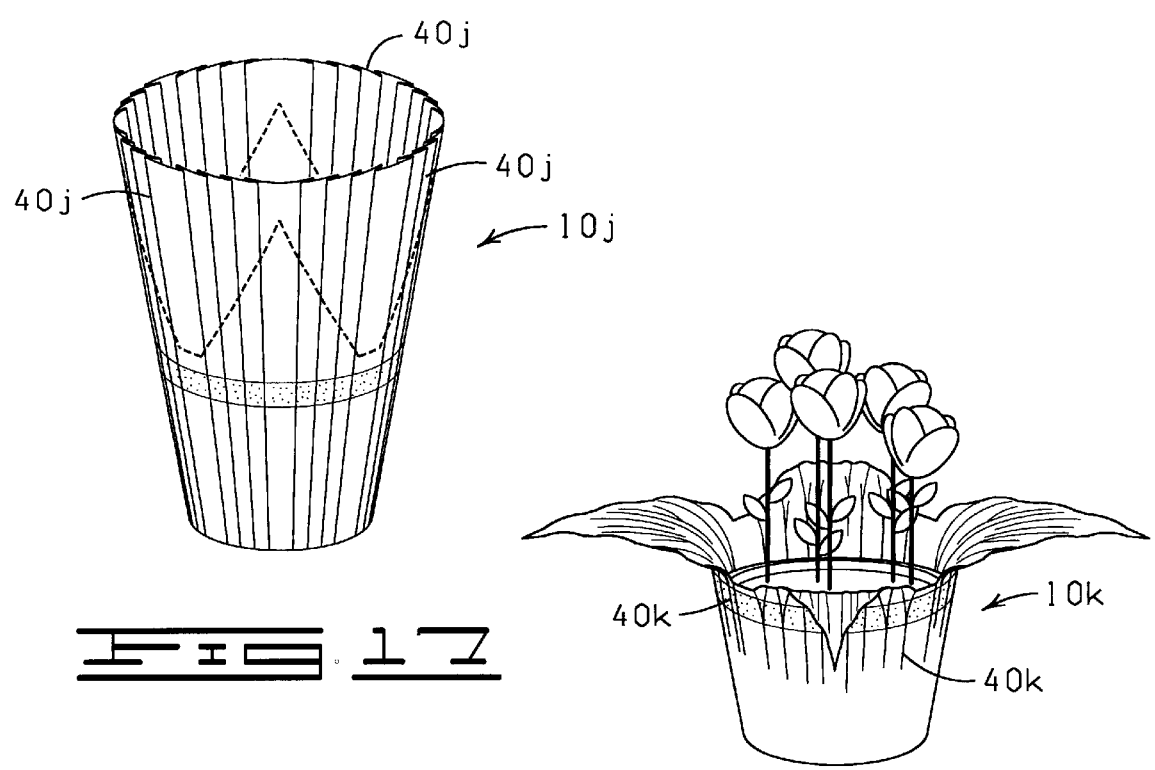

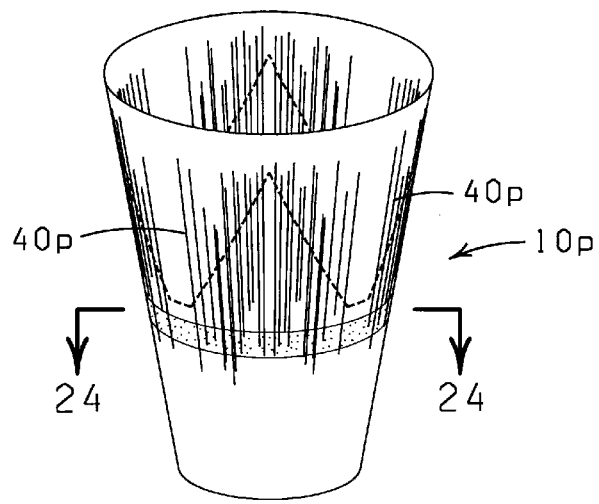
Fig. 23
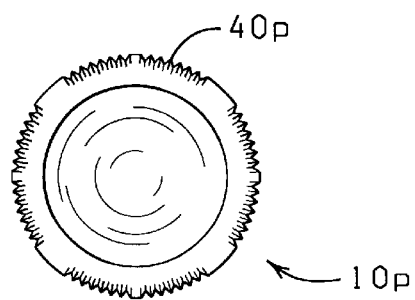
Fig. 24

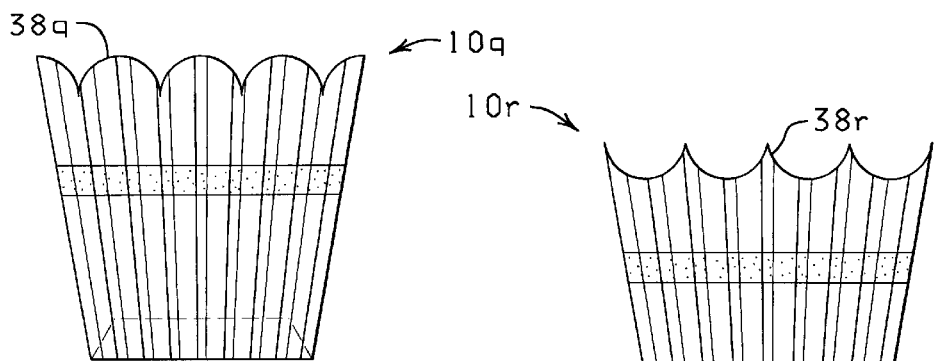
FIG. 25A
FIG. 25B
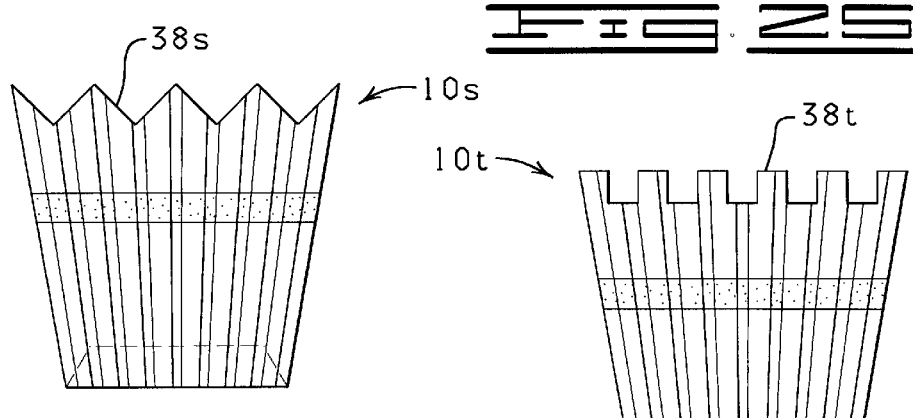
FIG. 25C
FIG. 25D
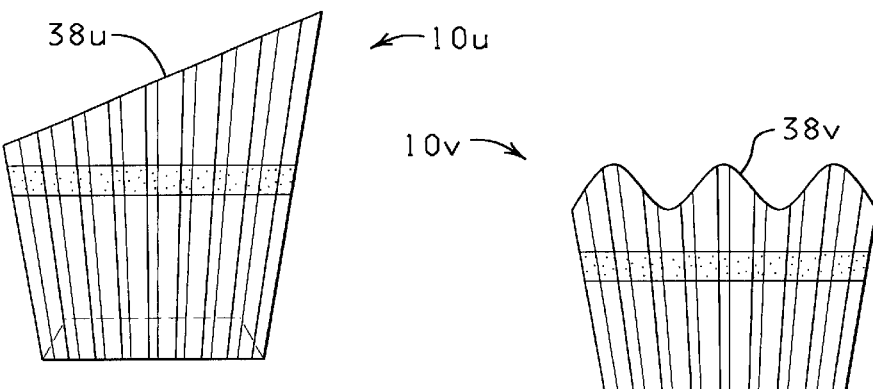
FIG. 25E
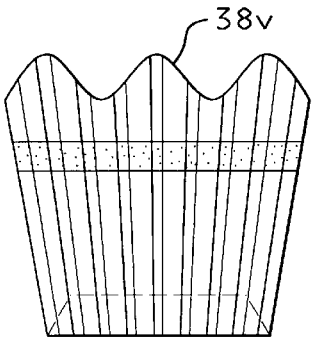
FIG. 25F

US 6,634,137 B2

FLORAL SLEEVE HAVING AN EXTENDABLE SKIRT AND METHODS

CROSS REFERENCE TO RELATED APPLICATIONS

The present application is a continuation of Ser. No. 09/929,699 filed Aug. 14, 2001 now U.S. Pat. No. 6,354,040, which is a continuation of U.S. Ser. No. 09/615,562 filed Jul. 13, 2000, now U.S. Pat. No. 6,298,602, which is a continuation of U.S. Ser. No. 09/064,460 filed Apr. 22, 1998, now U.S. Pat. No. 6,151,830, which is a continuation-in-part of U.S. Ser. No. 08/788,616 filed Jan. 27, 1997, now U.S. Pat. No. 5,749,171, which is a continuation-in-part of U.S. Ser. No. 08/237,078, filed May 3, 1994, now U.S. Pat. No. 5,625,979, which is a continuation-in-part of U.S. Ser. No. 08/220,852, filed Mar. 31, 1994, now U.S. Pat. No. 5,572,851. Each of these applications is hereby incorporated by reference herein in its entirety.

FIELD OF THE INVENTION

This invention generally relates to sleeves, and, more particularly, sleeves used to wrap flower pots containing floral groupings and/or mediums containing floral groupings, and methods of using same.

BRIEF DESCRIPTION OF THE DRAWINGS

FIG. 1 is a perspective view of a sleeve having a gusset and an upper detachable portion constructed in accordance with the present invention.

FIG. 2 is a perspective view of another sleeve having an upper detachable portion and constructed in accordance with the present invention.

FIG. 3 is an elevational view of a sleeve having a gusset without an upper detachable portion and constructed in accordance with the present invention.

FIG. 4 is an elevational view of another sleeve constructed in accordance with the present invention.

FIG. 5 is an elevational view of another sleeve constructed in accordance with the present invention.

FIG. 6 is an elevational view of another sleeve constructed in accordance with the present invention.

FIG. 7 is an elevational view of a sleeve having a connecting bonding material on the interior thereof.

FIG. 8 is a perspective view of an opened version of the sleeve of FIG. 1 having a potted plant disposed therein.

FIG. 9 is a perspective view of a potted plant covered by a sleeve such as the sleeve of any one of the sleeves of FIGS. 1–8.

FIG. 10 is an elevational view of a potted plant about to be disposed within a sleeve of the present invention.

FIG. 15 is a perspective view of a sleeve similar to the sleeve of FIG. 13 except the expansion elements do not extend completely to the upper end and lower ends of the sleeve and extend at various lengths longitudinally.

FIG. 16 is a cross-sectional view of the sleeve of FIG. 15 taken along the line 16—16 thereof.

FIG. 17 is a perspective view of another version of a sleeve constructed in accordance with the present invention wherein the sleeve comprises z-shaped folds.

FIG. 18 is a perspective view of a sleeve similar to the sleeve of FIG. 17 except without an upper sleeve portion and with the skirt extended.

FIG. 23 is a perspective view of a sleeve similar to the sleeve of FIG. 21 except the fluted or groove-shaped folds do not extend completely to the upper end or lower end of the sleeve.

FIG. 24 is a cross-sectional view of the sleeve of FIG. 23 taken along the line 24—24 thereof.

FIG. 25A is an elevational view of a sleeve constructed in accordance with the present invention having a skirt with an upper edge having a crenate or scalloped pattern.

FIG. 25B is an elevational view of a sleeve constructed in accordance with the present invention having a skirt with an upper edge having an inverted crenate or scalloped pattern.

FIG. 25C is an elevational view of a sleeve constructed in accordance with the present invention having a skirt with an upper edge having a crenulate, toothed, or zig-zag pattern.

FIG. 25D is an elevational view of a sleeve constructed in accordance with the present invention having a skirt with an upper edge having a crenelated or rectangular-shaped pattern.

FIG. 25E is an elevational view of a sleeve constructed in accordance with the present invention having a skirt with an upper edge having a diagonal pattern.

FIG. 25F is an elevational view of a sleeve constructed in accordance with the present invention having a skirt with an upper edge having a curved or wavy pattern.

DESCRIPTION OF THE PREFERRED EMBODIMENTS

Figure 11:
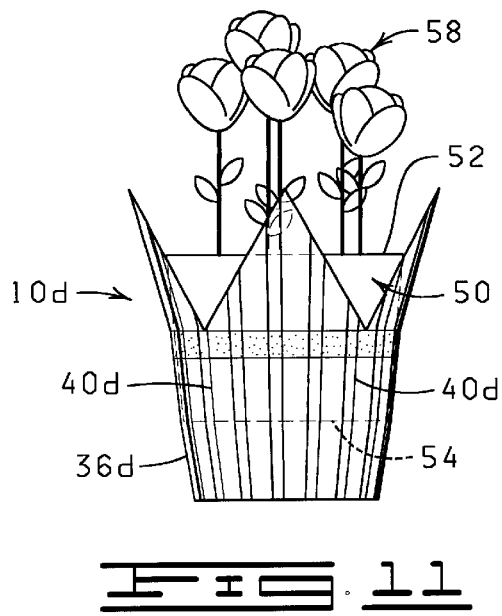
FIG. 11 is an elevational view of the potted plant of FIG. 10 partially disposed within the sleeve of FIG. 10.

The present invention contemplates a preformed sleeve for covering a pot having an upper end, a lower end, and an outer peripheral surface. The preformed sleeve comprises a base portion having an upper end, a lower end, and an interior space. A skirt portion extends from the upper end of the base portion. The sleeve comprises extension (or expansion) elements which comprise a plurality of folds in the base portion and in the skirt portion. The sleeve further comprises a connected portion which is made up of folds in the base portion adjacent the lower end of the skirt portion which are connected by an adhesive or cohesive bonding material. The connected portion may extend entirely circumferentially about the upper end of the base portion, or may extend only partially circumferentially about the upper end of the base portion. The bonding material may be disposed on the outer surface of the base, the inner surface of the base, or both the inner and outer surfaces of the base. The connected portion functions to constrict the expansion of an upper portion of the base portion such that when a pot is disposed within the sleeve, pressure is exerted by the pot onto the connected portion causing the skirt portion to extend at an angle to the base portion. The preformed sleeve may further comprise a detachable upper sleeve portion generally sized to enclose a floral grouping which when detached allows the skirt portion to extend angularly from the base portion when a pot is disposed within the base portion of the sleeve. The upper portion when present may be detachable via perforations, tear strips, weakened areas, or zippers. The upper sleeve portion may have an extended upper portion for serving as a handle or support device. The folds or expansion elements may extend the entire length from the lower end of the base portion to the upper end of the sleeve or may extend only an intermediate distance therebetween.

The expansion elements may be a plurality of vertical pleats, a plurality of vertical folds each having a Z-shaped cross section, a plurality of vertical accordion-type folds, or other similar types of expandable forms.

The preformed sleeve may form part of a plant package when used in conjunction with a pot disposed within the inner retaining space of the base portion of the preformed sleeve, the pot having a floral grouping disposed therein, and wherein the pot is substantially surrounded and encompassed by the base portion and the floral grouping is substantially surrounded and encompassed and enclosed by the upper sleeve portion when it forms a part of the preformed sleeve.

Also, the base portion may comprise a bonding material disposed on an inner peripheral surface thereof for bondingly connecting to a pot disposed therein. Further, the upper sleeve portion when present extends from the upper end of the skirt portion, or may be connected to the base portion. When the upper sleeve portion is connected to the base portion, it may be connected to an inner peripheral surface of the base portion, leaving the skirt portion exposed, or it may be attached to an outer peripheral surface of the base portion, and may thereby enclose the skirt portion until it is detached from the base portion.

The base portion and the skirt portion of the preformed tubular sleeve may be constructed from a first material and the upper sleeve portion constructed from a second material different from the first material. The base portion and the upper sleeve portion of the preformed sleeve may be constructed from a first material and the skirt portion constructed from a second material different from the first material. The preformed sleeve may comprise a portion of a plant package which additionally comprises a pot disposed within the sleeve, the pot having a floral grouping disposed therein, and wherein the pot is substantially surrounded and encompassed by the base portion.

These embodiments and others of the present invention are now described in more detail below. It will be appreciated that the examples provided herein are not intended to limit the scope and extent of the claimed invention but are only intended to exemplify various embodiments of the invention contemplated herein.

The Embodiments and Methods of Use of FIGS. 1–25F

Shown in FIG. 1 and designated therein by the general reference numeral 10 is a flexible preformed sleeve of unitary construction. The sleeve 10 preferably initially comprises a flexible flat collapsed piece of material which is openable in the form of a tube or sleeve. In an alternative embodiment, the sleeve may be formed in an opened frusto-conical configuration. The sleeve 10 is preferably tapered outwardly from the lower end toward a larger diameter at its upper end. In its flattened state the sleeve 10 has an overall trapezoidal or modified trapezoidal shape, and when opened is substantially frusto-conical to coniform. It will be appreciated, however, that the sleeve 10 may comprise variations on the aforementioned shapes or may comprise significantly altered shapes such as square or rectangular, wherein the sleeve 10 when opened has a cylindrical form, as long as the sleeve 10 functions in accordance with the present invention in the manner described herein.

The sleeve 10 has an upper end 12, a lower end 14, an outer peripheral surface 16 and in its flattened state has a first side 18 and a second side 20. The sleeve 10 has an opening 22 at the upper end 12 and may be open at the lower end 14 (not shown), or closed with a bottom at the lower end 14. The sleeve 10 also has an inner peripheral surface 24 which, when the sleeve 10 is opened, defines and encompasses an inner retaining space 23. When the lower end 14 of the sleeve 10 is closed, a portion of the lower end 14 may be inwardly or outwardly folded to form one or more gussets 26 constructed in a manner well known to one of ordinary skill in the art as shown in FIG. 1 for permitting a circular bottom of an object such as a potted plant (not shown) to be disposed into the inner retaining space 23 of the lower end 14 of the sleeve 10. Further the lower end 14 may be constructed in the manner shown in copending U.S. Ser. No. 08/606,957, the specification of which is hereby incorporated herein in its entirety. FIG. 2 shows a sleeve 10a formed without a gusset in a lower end 14a.

The sleeve 10 is generally frusto-conically shaped, but the sleeve 10 may be, by way of example but not by way of limitation, cylindrical, frusto-conical, a combination of both frusto-conical and cylindrical, or any other shape, as long as the sleeve 10 functions as described herein as noted above. Further, the sleeve 10 may comprise any shape, whether geometric, non-geometric, asymmetrical and/or fanciful as long as it functions in accordance with the present invention. The sleeve 10 may also be equipped with drainage holes (e.g., one or more holes) in the base portion or bottom thereof or ventilation holes (not shown) in the base or upper sleeve portion, or can be made from permeable or impermeable materials.

The material from which the sleeve 10 is constructed preferably has a thickness in a range from about 0.1 mil to about 30 mils. Often, the thickness of the sleeve 10 is in a range from about 0.5 mil to about 10 mils. Preferably, the sleeve 10 has a thickness in a range from about 1.0 mil to about 5 mils. More preferably, the sleeve 10 is constructed from a material which is flexible, semi-rigid, rigid, or any combination thereof. The sleeve 10 may be constructed of a single layer of material or a plurality of layers of the same or different types of materials. Any thickness of the material may be utilized as long as the material functions in accordance with the present invention as described herein. The layers of material comprising the sleeve 10 may be connected together or laminated or may be separate layers. Such materials used to construct the sleeve 10 are described in U.S. Pat. No. 5,111,637 entitled "Method For Wrapping A Floral Grouping" issued to Weder et al., on May 12, 1992, which is hereby incorporated herein by reference. Any thickness of material may be utilized in accordance with the present invention as long as the sleeve 10 may be formed as described herein, and as long as the formed sleeve 10 may contain at least a portion of a pot or potted plant or a floral grouping, as described herein. Additionally, an insulating material such as bubble film, preferable as one of two or more layers, can be utilized in order to provide additional protection for the item, such as the floral grouping, contained therein.

In one embodiment, the sleeve 10 may be constructed from a sheet comprising two polypropylene films. The material comprising the sleeve 10 may be connected together or laminated or may be separate layers. In an alternative embodiment, the sleeve 10 may be constructed from only one of the polypropylene films.

The sleeve 10 is constructed from any suitable material that is capable of being formed into a sleeve and wrapped about a pot and a floral grouping disposed therein. Preferably, the material comprises untreated or treated paper, metal foil, polymeric film, non-polymeric film, woven or non-woven fabric, natural or synthetic fabric, cardboard, fiber, cloth, burlap, or laminations or combinations thereof.

The term "polymeric film" means a man-made polymeric film such as a polypropylene or a naturally occurring polymeric film such as cellophane. A polymeric film is relatively strong and not as subject to tearing (substantially non-tearable), as might be the case with paper or foil.

The material comprising the sleeve 10 may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. The material may further comprise, or have applied thereto, one or more scents. Each of the above-named characteristics may occur alone or in combination and may be applied to the upper and/or lower surface of the material comprising the sleeve 10. Moreover, portions of the material used in constructing the sleeve 10 may vary in the combination of such characteristics. The material utilized for the sleeve 10 itself may be opaque, translucent, transparent, or partially clear or tinted transparent.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item (not shown), or a propagule (not shown). The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

In accordance with the present invention, a bonding material (not shown) may be disposed on a portion of the sleeve 10 to assist in holding the sleeve 10 to the pot having the floral grouping therein when such a pot is disposed within the sleeve or to assist in closing or sealing the upper portion of the sleeve 10 or in adhering the sleeve 10 to the pot after the pot has been disposed therein, as will be discussed in further detail below.

It will be understood that the bonding material may be disposed as a strip or block on a surface of the sleeve 10. The bonding material may also be disposed upon either the outer peripheral surface 16 or the inner peripheral surface 24 of the sleeve 10, as well as upon the pot. Further, the bonding material may be disposed as spots of bonding material, or in any other geometric, non-geometric, asymmetric, or fanciful form, and in any pattern including covering either the entire inner peripheral surface and/or outer peripheral surface of the sleeve 10 and/or the pot or pot cover. The bonding material may be covered by a cover or release strip which can be removed prior to the use of the sleeve, pot or pot cover. The bonding material can be applied by means known to those of ordinary skill in their art. One method for disposing a bonding material, in this case an adhesive, is described in U.S. Pat. No. 5,111,637 entitled "Method For Wrapping A Floral Grouping" issued to Weder et al., on May 12, 1992, which has been incorporated by reference above.

The term "bonding material" when used herein means an adhesive, frequently a pressure sensitive adhesive, or a cohesive. When the bonding material is a cohesive, a similar cohesive material must be placed on the adjacent surface for bondingly contacting and bondingly engaging with the cohesive material. The term "bonding material" also includes materials which are heat sealable and, in this instance, the adjacent portions of the material must be brought into contact and then heat must be applied to effect the seal. The term "bonding material" also includes materials which are sonic sealable and vibratory sealable. The term "bonding material" when used herein also means a heat sealing lacquer or hot melt material which may be applied to the material and, in this instance, heat, sound waves, or vibrations, also must be applied to effect the sealing.

Alternatively, a cold seal adhesive may be utilized as the bonding material. The cold seal adhesive adheres only to a similar substrate, acting similarly as a cohesive, and binds only to itself. The cold seal adhesive, since it bonds only to a similar substrate, does not cause a residue to build up on equipment, thereby both permitting much more rapid disposition and use of such equipment to form articles and reducing labor costs. Further, since no heat is required to effect the seal, the dwell time, that is, the time for the sheet of material to form and retain the shape of an article, such as a flower pot cover or flower pot, is reduced. A cold seal adhesive binds quickly and easily with minimal pressure, and such a seal is not readily releasable. This characteristic is different from, for example, a pressure sensitive adhesive.

As shown in FIG. 1, the sleeve 10 in one embodiment is demarcated into an upper portion 30 and a lower portion 32. The lower portion 32 of the sleeve 10 is generally sized to contain a potted plant (not shown). The upper portion 30 of the sleeve 10 is sized to substantially surround and encompass a floral grouping contained within the potted plant disposed within the lower portion 32 of the sleeve 10. The sleeve 10 is demarcated into the upper portion 30 and the lower portion 32 by a detaching element 34 for enabling the detachment of the upper portion 30 of the sleeve 10 from the lower portion 32 of the sleeve 10. In the present version, the detaching element 34 is a plurality of generally curved, scalloped, laterally-oriented or alternatingly diagonally-oriented perforations which extend circumferentially across the outer peripheral surface 16 of the sleeve 10 from the first side 18 to the second side 20. The term "detaching element," as used generally herein, means any element, or combination of elements, or features, such as, but not by way of limitation, perforations, tear strips, zippers, and any other devices or elements of this nature known in the art, or any combination thereof, which enable the tearing away or detachment of one object from another. Therefore, while perforations are shown and described in detail herein, it will be understood that tear strips, zippers, or any other "detaching elements" known in the art, or any combination thereof, could be substituted therefore and/or used therewith.

In a preferred embodiment, as shown in FIG. 1, the lower portion 32 of the sleeve 10 further comprises a base portion 36, and a skirt portion 38. The base portion 36 comprises that part of the lower portion 32 which, when a pot is placed into the lower portion 32, has an inner peripheral surface 24 which is substantially adjacent to and surrounds the outer peripheral surface of the pot (not shown). The skirt portion 38 comprises that portion of the lower portion 32 which extends beyond an upper rim of the pot and adjacent at least a portion, generally a lower portion, of the floral grouping contained within the pot and which is left to freely extend at an angle, inwardly or outwardly, from the base portion 36 when the upper portion 30 of the sleeve 10 is detached from the lower portion 32 of the sleeve 10 by actuation of the detaching element 34. In the intact sleeve 10, the skirt portion 38 comprises an upper peripheral edge congruent with the detaching element 34 which is connected to a lower peripheral edge, also congruent with the detaching element 34, of the upper portion 30 of the sleeve 10. In FIG. 1, the upper peripheral edge of the skirt portion 38 is congruent with a series of alternatingly diagonally-oriented lines of perforations which together form a zig-zag and comprise the detaching element 34.

The upper portion 30 of the sleeve 10 may also have an additional vertical detaching element comprising a plurality of vertical perforations (not shown) for facilitating removal of the upper portion 30 and which are disposed more or less vertically therein extending between the detaching element 34 of the sleeve 10 and the upper end 12. The upper portion 30 of the sleeve 10 is separable from the lower portion 32 of the sleeve 10 by tearing the upper portion 30 along both the vertical perforations (when present) and the detaching element 34, thereby separating the upper portion 30 from the lower portion 32 of the sleeve 10. The lower portion 32 of the sleeve 10 remains disposed as the base portion 36 about the pot and as the skirt portion 38 about the floral grouping forming a decorative cover 48 (FIG. 9) which substantially surrounds and encompasses the potted plant.

It will be understood by a person of ordinary skill in the art that equipment and devices for forming floral sleeves are commercially available, and are well known to a person of ordinary skill in the art. Therefore, further discussion of the construction of the covers described herein is not deemed necessary.

As noted above, the sleeve 10 may have an open or closed lower end 14. When the lower end 14 is closed the lower end 14 may have one or more gussets 26 formed therein such as that seen in sleeve 10 in FIG. 1 for allowing expansion of the lower end 14 when an object with a broad lower end such as a pot is disposed therein. In another version of the present invention a strip of bonding material (not shown) may be disposed adjacent the upper end 12 of the sleeve for allowing the upper end 12 to be sealed for enclosing the upper portion 30 of the sleeve 10 about a floral grouping disposed therein. In another version of the present invention, a sleeve may comprise a flap (not shown) positioned at the upper end 12 which can be folded over and sealed with a flap bonding strip to an adjacent portion of the outer peripheral surface 16 of the sleeve near the upper end 12 thereof. Other versions of the sleeve (not shown) may comprise ventilation holes or drainage holes in the lower portion 32 for allowing movement of gases or moisture to and away from the inner retaining space 23 of the sleeve 10.

In another version of the present invention (not shown), the sleeve 10 may comprise an inner strip or area of bonding material (not shown) disposed upon a portion of the inner peripheral surface 24 of the lower portion 32 which functions to enable the inner peripheral surface 24, or a portion thereof, to be bondingly connected to the outer peripheral surface of the pot disposed therein causing the sleeve 10 to be bondingly connected to the pot.

In another embodiment (not shown), the sleeve 10, may further comprise an extended portion having apertures therein, which portion extends away from a portion of the upper end 12 of the sleeve 10 for allowing the sleeve 10 to be supported on a support assembly commercially available and known by one of ordinary skill in the art such as a pair of wickets for shipment, storage, assembly of the sleeve 10, placement of the pot within the sleeve 10, or other functions known in the art. The extension may have a plurality of perforations or other detaching elements for allowing the extension to be removed from the upper end 12 after the sleeve 10 has been provided for use as described elsewhere herein. Alternatively, the sleeve 10 may be supported by apertures in the upper portion 10. In another version of the invention (not shown), the sleeve 10 has an extended portion comprising a handle for carrying the potted plant package by the sleeve (10). The sleeve 10 may further comprise a detaching element comprising perforations for removing the handle at a later time.

Other versions of the present invention (not shown), may comprise additional perforated areas for enhancing angularity of the extension of the skirt portion 38 away from the base portion 36 after the upper portion 30 of the sleeve 10 has been detached. Examples of such sleeves described above herein comprising these additional features are shown in FIGS. 6–8 and 14–20 of U.S. Pat. No. 5,625,979 and the corresponding descriptions therein, which are specifically hereby incorporated herein by reference.

The sleeve 10 herein is further contemplated as having extension (or expansion) elements comprising at least one vertically oriented fold 40 which may extend from the upper end 12 to the lower end 14 of the sleeve 10.

The one or more folds 40 extend at least from a portion of the base portion 36 to a portion of the skirt portion 38 and may extend into the upper portion 30 as shown in FIG. 1. The extension elements, comprising the one or more folds 40, functions to allow expansion of a portion of the base portion 36 and of the skirt portion 38 of the sleeve 10 when a pot is inserted into the inner retaining space 23 of the sleeve 10.

As shown in FIG. 1, each fold 40 of the sleeve 10 comprises one or more areas of excess material shaped in the form of a pleat which extends from the base portion 36 to the upper end 12 of the sleeve 10. As used herein, the term "excess material" means an amount of material which has a greater surface area than would actually be necessary to form that portion of the plant covering were that portion of the plant covering actually flattened. The fold 40 can expand causing portions of the upper sleeve portion 30 and/or the skirt portion 38 to extend angularly from the base portion 36.

As contemplated herein, the invention further comprises a connected portion 44 which comprises connected overlapped portions of the folds 40 of the sleeve 10. The folds 40 comprising the connected portion 44 are preferably connected by an adhesive or cohesive bonding material 46 which is disposed upon a portion of the inner peripheral surface 24, and/or outer peripheral surface 16 of the base portion 36 of the sleeve 10. The bonding material 46 may extend upon a portion of the skirt portion 38. The connected portion 44 is preferably located at an upper end 37 of the base portion 36 below the skirt portion 38 and may extend completely or partially about the circumference of the sleeve 10. The connected portion 44 of the folds 40 may be located on the inner peripheral surface 24 or outer peripheral surface 16 of the base portion 36 of the sleeve 10. The connected portion 44 functions to constrict the expansion of the folds 40 of the upper end 37 of the base portion 36 when a pot is disposed within the sleeve 10, thereby causing the skirt portion 38 to extend at an angle, for example, outwardly, from the base portion 36 of the sleeve 10 as will be described in more detail below.

The folds 40 in the sleeve 10 contemplated herein may be constructed in such a manner that each fold 40 extends completely from the lower end 14 of the sleeve 10 to the upper end 12 of the sleeve 10 as shown in FIG. 1. Alternatively as shown in FIG. 2, a sleeve 10a may comprise folds 40a which are parallel such that some of the folds 40a extend the entire distance from the upper end 12a to the lower end 14a, while other folds 40a, particularly those near sides 18a and 20a, extend from the upper end 12a only part of the distance toward the lower end 14a of the sleeve 10a and may intersect sides 18a or 20a. The folds 40a in sleeve 10a are substantially parallel when the sleeve 10a is in the flattened condition. Henceforth the term "tapering folds" will be used in reference to the pattern of folds in the embodiment of sleeve 10 of FIG. 1 while the term "parallel folds" will be used in reference to the pattern of folds in the embodiment of sleeve 10a of FIG. 2.

Attention is now drawn to the embodiment of a sleeve of the present invention designated by reference numeral 10b in FIG. 3. Sleeve 10b is constructed without a detachable upper sleeve portion. Sleeve 10b has tapered folds 40b and has a skirt portion 38b which in the flattened condition extends at an angle from a base portion 36b and has a connected portion 44b which is similar to the connected portion 44 described above. Sleeve 10b is shown as having a bonding material 46b for connecting the tapered folds 40b in the connected portion 44b which is externally disposed on the outer peripheral surface 16b of the base portion 36b, however the bonding material 46b may also be disposed internally upon the inner peripheral surface (not shown) of the base portion 36b in the same manner as described for bonding material 46 in sleeve 10. The sleeve of FIG. 4 designated by the reference numeral 10c is similar to the sleeve 10b except it has folds 40c which are parallel, and has a lower end 14c which has a straight seal. It will of course be understood by a person of ordinary skill in the art that sleeve 10c may be formed with a gussetted bottom, and sleeve 10b, may be formed without a gussetted bottom. Referring now to FIGS. 5 and 6, sleeves 10d and 10e are similar to sleeves 10b and 10c, respectively, except the angle of the outer edge of skirt portions 38d and 38e forms a straight line with the outer edge of base portions 36d and 36e, respectively. The skirt portion of any of the sleeves defined herein may extend at other angles not described herein such as at an inwardly facing angle.

Shown in FIG. 7 is a sleeve 10f which exemplifies the embodiment wherein a connected portion 44f is connected internally by a bonding material 46f disposed on the inner peripheral surface (not shown) of the sleeve 10f.

Referring now to FIG. 8, the sleeve 10 of FIG. 1 is shown as having a pot 50 disposed therein, in phantom view. The pot 50 has an upper end 52, a lower end 54, and an outer peripheral surface 56, and has a plant or floral grouping 58 disposed therein. The upper portion 30 of the sleeve 10 surrounds and generally encompasses the floral grouping 58. When the upper portion 30 is detached along the detaching element 34, the skirt portion 38 extends away from the upper end 37 of the base portion 36, for example in a manner as shown in FIG. 9, which shows a decorative cover 48 which is left surrounding the pot 50 after the upper sleeve portion 30 has been detached. It will be understood by a person of ordinary skill in the art that the embodiments of FIGS. 8 and 9 exemplify the combination of any of the sleeves described in FIGS. 1–7 as will be obvious in light of the disclosure provided herewith.

It will generally be desired to use the sleeve 10 as a covering for a potted plant (FIGS. 8–9). As shown in FIG. 8, the lower end 54 of the pot 50 is closed but may have holes (not shown) for permitting water drainage. The term "Pot" as used herein refers to any type of container used for holding a floral grouping or plant. Examples of pots, used in accordance with the present invention include, but not by way of limitation, clay pots, wooden pots, plastic pots, pots made from natural and/or synthetic fibers, or any combination thereof. The pot is adapted to receive a floral grouping. The floral grouping may be disposed within the pot along with a suitable growing medium described in further detail below, or other retaining medium, such as a floral foam. It will also be understood that the floral grouping, and any appropriate growing medium or other retaining medium, may be disposed in the sleeve without a pot.

Figure 12:
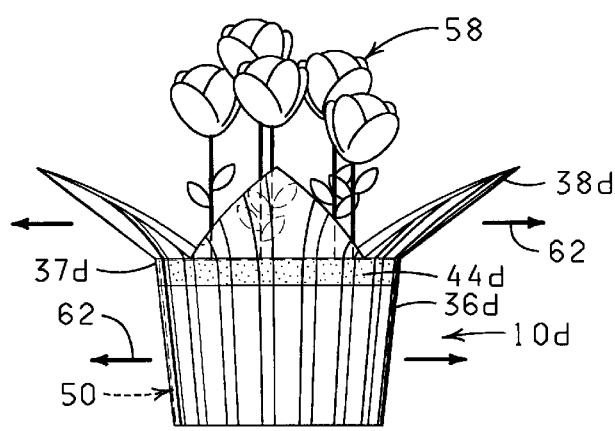
FIG. 12 is an elevational view of the potted plant of FIG. 10 fully disposed within the sleeve of FIG. 10, wherein the arrows indicate outward expansion of portions of the sleeve.

Referring now to FIGS. 10–12, a preferred method of how the present invention is employed is shown. Shown in FIG. 10 is a sleeve such as sleeve 10d of FIG. 5. The pot 50 is disposed into an inner retaining space of sleeve 10d in a direction 60. As the pot 50 is disposed within the sleeve 10d, the pot 50 begins to deform the base portion 36d and begins to cause the folds 40d to expand as shown in FIG. 11. As the pot 50 is further disposed with the sleeve 10d, the pot 50 causes the base portion 36d to further expand in an outward direction 62 as shown in FIG. 12. As the pot 50 exerts pressure on the inner peripheral surface 24d of the sleeve 10d and upon the connected portion 44d, the skirt portion 38d is caused to expand a distance outwardly angularly from the upper end 37d of the base portion 36d. In an alternative embodiment the skirt portion 38d may be caused to extend at an inward direction (not shown) toward the floral grouping 58.

Figure 13:
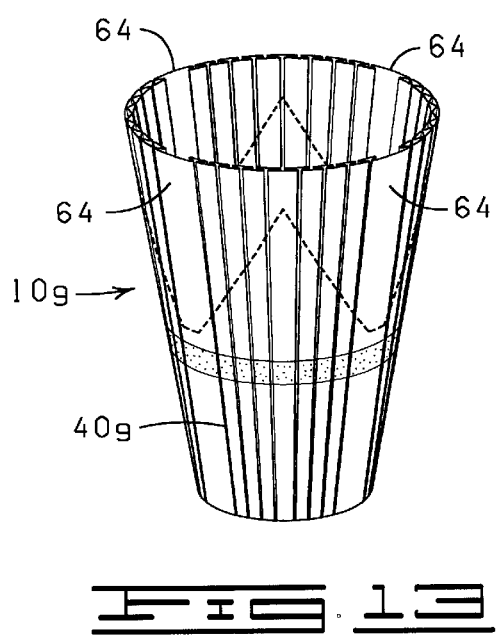
FIG. 13 is a perspective view of the sleeve of the present invention showing the sleeve in an opened condition and wherein the sleeve comprises pleated folds.

Referring now to FIG. 13, attention is drawn to the sleeve designated by the general reference numeral 10g which is similar to the sleeve 10 except sleeve 10g has portions therein, designated by the reference numeral 64 which are formed without folds 40g therein. It will be understood by a person of ordinary skill in the art that the size, extent and area of the portions 64 may vary according to the desired structure, performance, and manner of use of the sleeve.

Figure 14:
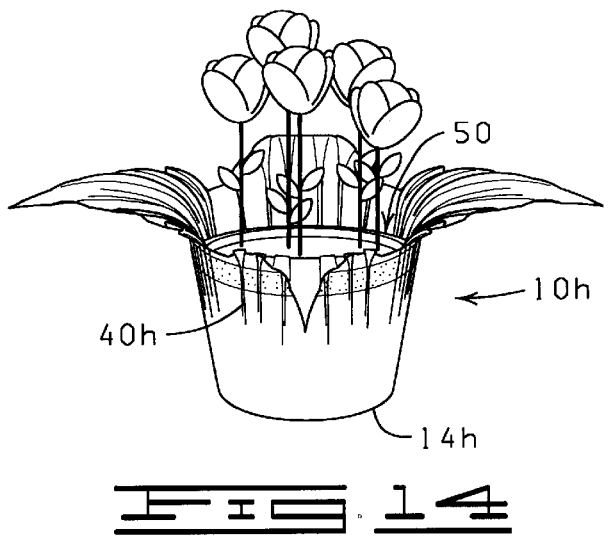
FIG. 14 is a perspective view of a sleeve similar to the sleeve of FIG. 13 except without an upper sleeve portion and with the skirt extended.

Shown in FIG. 14 is a sleeve 10h, having the pot 50 therein. The sleeve 10h is similar to any of sleeves 10–10g described previously except the folds 40h extend various vertical distances and generally do not extend all the way to a lower end 14h of the sleeve 10h. FIG. 15 shows a sleeve 10i which is similar to the sleeve 10h except sleeve 10i has detachable upper portion 30i. FIG. 16 shows a cross-section of sleeve 10i showing the pleated construction of folds 40i and the portion 64 of the sleeve 10i lacking a fold 40i.

Figures 19, 20:
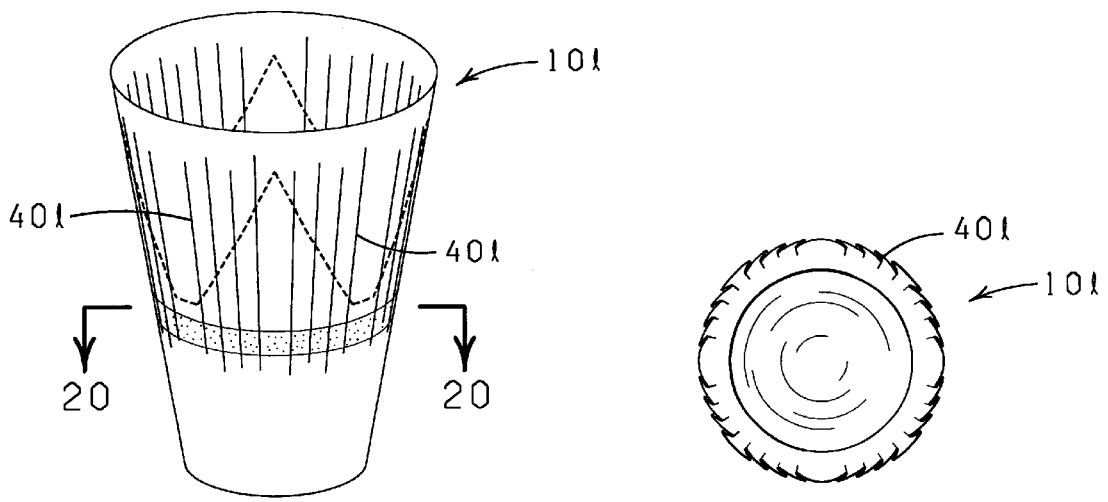
FIG. 19 is a perspective view of sleeve similar to the sleeve of FIG. 17 except the z-shaped folds do not extend completely to the upper end and lower end of the sleeve.
FIG. 20 is a cross-sectional view of the sleeve of FIG. 19 taken along the line 20—20 thereof.

Shown in FIG. 17 is a sleeve 10j which is similar to the sleeve 10g except the folds, designated by the reference numeral 40j, are z-shaped in cross-section. Sleeve 10k of FIG. 18 is similar to sleeve 10h of FIG. 14 except the folds, designated as folds 40k, are z-shaped in cross-section like the folds 40j of sleeve 10j. Sleeve 10l of FIG. 19 is similar to sleeve 10i of FIG. 15 except the folds 40l are z-shaped in cross-section. Sleeve 10l is shown in cross-section in FIG. 20.

Figures 21, 22:
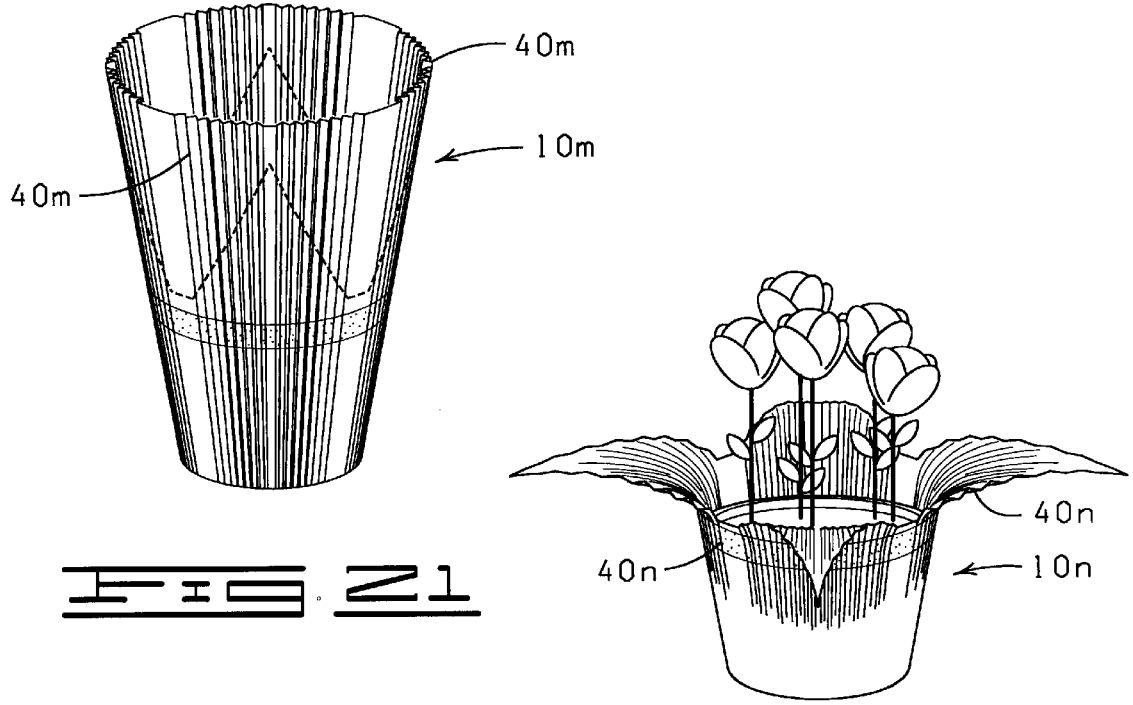
FIG. 21 is a perspective view of an alternate version of a sleeve constructed in accordance with the present invention wherein the sleeve comprises fluted or groove-shaped folds.
FIG. 22 is a perspective view of a sleeve similar to the sleeve of FIG. 21 except without an upper sleeve portion and with the skirt extended.

Shown in FIG. 21 is a sleeve 10m which is similar to the sleeve 10g except the folds, designated by the reference numeral 40m, are fluted, or accordion-shaped in cross-section. Sleeve 10n of FIG. 22 is similar to sleeve 10h of FIG. 14 except the folds, designated as folds 40n, are fluted, or accordion-shaped in cross-section like the folds 40m of sleeve 10m. Sleeve 10p is similar to sleeve 10i of FIG. 15 except the folds 40p are fluted, or accordion-shaped in cross-section. Sleeve 10p is shown in cross-section in FIG. 24.

The protective "upper sleeve portion" and the "base portion" of the sleeve and components of the present invention may comprise a unitary construction, as described in the versions of the invention exemplified in FIGS. 1–24, or may comprise separately formed components which are attached together by various bonding materials, as described for example in U.S. Pat. No. 5,625,979 mentioned supra.

In an alternative version of the invention (not shown), a bonding material may be disposed on the outer peripheral surface 56 of the pot 50 while the sleeve 10–10p is free of a bonding material (except for the bonding material used to form the connected portion of the folds). In this case, when the pot 50 is disposed into the open sleeve 10–10p, the bonding material on the outer peripheral surface 56 of the pot 50 engages a portion of the inner peripheral surface 24 of the sleeve 10–10p causing the sleeve 10–10p to be bondingly connected to a portion of the outer peripheral surface 56 of the pot 50.

In yet another version of the method of the present invention (not shown), a bonding material may be disposed on both the outer peripheral surface 56 of the pot 50 and the inner peripheral surface 24 of the sleeve 10–10p. In such a case, preferably the bonding material both of the pot 50 and the sleeve 10–10p is a cohesive which allows bonding to a surface covered with the cohesive but not to dissimilar surfaces.

As shown in FIGS. 1–24, the skirt portion 38 preferably comprises a plurality of "petals". It will be understood, however, that the design of the skirt portion 38 is not meant to be limited to a "petal" design and may be constructed in any number of other decorative patterns, several being shown in FIGS. 25A–25F. For example, FIG. 25A shows a sleeve 10q having a skirt portion 38q having a crenate or scalloped pattern. FIG. 25B shows a sleeve 10r having a skirt portion 38r having a crenate or scalloped pattern which is inverted. FIG. 25C shows a sleeve 10s having a skirt portion 38s having a crenulate toothed or zig-zag pattern. FIG. 25D shows a sleeve 10t having a skirt portion 38t having a crenelated or rectangular-shaped pattern. FIG. 25E shows a sleeve 10u having a skirt portion 38u having a diagonal pattern slanted upwardly from one side of the sleeve 10u to the other. FIG. 25F shows a sleeve 10v having a skirt portion 38v having a curved or wavy pattern. One of ordinary skill in the art will understand these are but a few of the patterns that the perforations may form and one of ordinary skill could contemplate many other suitable patterns.

The sleeves described herein may be formed by intermittently advancing two separate webs, one or two webs preformed in the form of a tube, or a single web folded double and sealing the longitudinal sides and bottom of the two facing panels then cutting the sleeve thus formed from the webs or web. Machines which can form sleeves from such single webs or pairs of webs are well within the knowledge of one of ordinary skill in the art.

It should also be noted that for all versions of sleeves described, it may be desirable to have a release material or cover strip covering the adhesive or cohesive bonding material disposed on any portion of the sleeve for preventing the bonding material from bonding to another surface until the desired time. Further in each of the cases described herein wherein a sleeve is applied to a pot or a covered pot, the sleeve may be applied thereto either by depositing the pot or covered pot downwardly into the open retaining space of the sleeve, or the sleeve may be brought upwardly about the pot or covered pot from below the pot or a covered pot.

It should be further noted that various features of the versions of the present invention such as closure bonding areas, support extensions, handles, additional perforations, drainage holes, ventilation holes, combinations of material may be used alone or in combination as elements of any of the embodiments described above herein.

Changes may be made in the construction and the operation of the various components, elements and assemblies described herein or in the steps or the sequence of steps of the methods described herein without departing from the spirit and scope of the invention as defined in the following claims.

What is claimed is:

1. A preformed sleeve for covering a pot, the preformed sleeve initially having a flattened state, comprising:
    a base portion having an upper end, a lower end, and an interior space when opened;
    a skirt portion extending from the upper end of the base portion;
    extension elements comprising a plurality of folds in the base portion and in the skirt portion; and
    a connected portion comprising portions of the folds in the base portion adjacent the skirt portion which are connected for constricting expansion of an upper portion of the base portion, and wherein the skirt portion extends outwardly when a pot is disposed within the preformed sleeve.

2. The preformed sleeve of claim 1 further comprising an upper sleeve portion extending from the skirt portion and detachable therefrom.

3. The preformed sleeve of claim 1 wherein the base portion is further defined as being sized to substantially cover an outer peripheral surface of a pot.

4. The preformed sleeve of claim 1 further defined as constructed from a material having a thickness in a range of from about 0.1 mil to about 30 mils.

5. The preformed sleeve of claim 1 further defined as having a gusset in the lower end of the base portion.

6. The preformed sleeve of claim 1 further defined as constructed from a material having a thickness in a range of from about 1 mil to about 5 mils.

7. The preformed sleeve of claim 1 further defined as constructed from a material selected from the group consisting of treated or untreated paper, metal foil, polymeric film, non-polymeric film, cardboard, fiber, cloth, burlap, and laminations or combinations thereof.

8. The preformed sleeve of claim 1 wherein the plurality of folds further comprises a plurality of pleats, a plurality of folds each having a z-shaped cross section, or a plurality of accordion-type folds.

9. The preformed sleeve of claim 1 further comprising an extended portion for serving as a handle or support device.

10. The preformed sleeve of claim 1 wherein the base portion has a drainage element therein.

11. The preformed sleeve of claim 1 wherein the folds in the extension elements are continuous between the base portion and the skirt portion.

12. A preformed sleeve for covering a pot, the preformed sleeve initially having a flattened state, comprising:
a base portion having an upper end, a lower end, and an interior space when opened;
a skirt portion extending from the upper end of the base portion;
a detachable upper sleeve portion extending beyond the skirt portion and sized to substantially surround and enclose a floral grouping;
extension elements comprising a plurality of folds in the base portion and in the skirt portion; and
a connected portion comprising portions of the folds in the base portion adjacent the skirt portion which are connected for constricting expansion of an upper portion of the base portion, and wherein the skirt portion extends outwardly when a pot is disposed within the preformed sleeve.

13. The preformed sleeve of claim 12 wherein the base portion is further defined as being sized to substantially cover an outer peripheral surface of a pot.

14. The preformed sleeve of claim 12 further defined as constructed from a material having a thickness in a range of from about 0.1 mil to about 30 mils.

15. The preformed sleeve of claim 12 further defined as constructed from a material selected from the group consisting of treated or untreated paper, metal foil, polymeric film, non-polymeric film, cardboard, fiber, cloth, burlap, and laminations or combinations thereof.

16. The preformed sleeve of claim 12 wherein the plurality of folds further comprises a plurality of pleats, a plurality of folds each having a z-shaped cross section, or a plurality of accordion-type folds.

17. The preformed sleeve of claim 12 further comprising an extended portion for serving as a handle or support device.

18. The preformed sleeve of claim 12 wherein the base portion has drainage element therein.

19. The preformed sleeve of claim 12 wherein the folds in the extension elements are continuous between the base portion and the skirt portion.

20. A method of covering a pot having an upper end, a lower end, and an outer peripheral surface, comprising the steps of:
providing a preformed sleeve initially having a flattened state, comprising:
a base portion having an upper end, a lower end, a gusset in the lower end, and an interior space when opened,
a skirt portion extending from the upper end of the base portion,
an extension comprising a plurality of folds in the base portion and in the skirt portion, and the base portion having a connected portion comprising portions of the folds below the skirt portion which are connected for constricting expansion of an upper portion of the base portion; and
disposing a pot into the interior space of the preformed sleeve causing the skirt portion to extend outwardly.

21. The method of claim 20 wherein the preformed sleeve further comprises an upper sleeve portion extending from the skirt portion and which is detachable therefrom.

22. The method of claim 20 wherein in the preformed sleeve the folds at least a portion of the plurality of are continuous between the base portion and the skirt portion.

23. The method of claim 20 wherein the preformed sleeve further comprises a detachable upper sleeve portion which extends beyond the skirt portion and which is sized to substantially surround a floral grouping disposed within the pot.

* * * * *

UNITED STATES PATENT AND TRADEMARK OFFICE
CERTIFICATE OF CORRECTION

PATENT NO. : 6,634,137 B2
DATED : October 21, 2003
INVENTOR(S) : Donald E. Weder It is certified that error appears in the above-identified patent and that said Letters Patent is hereby corrected as shown below:

Title page,
Item [63], Related U.S. Application Data, after "of" and before "No." change "application" to -- U.S. Serial No. -- (all occurrences);
after "now" and before "Pat." add -- U.S -- (all occurrences).

Column 11,
Line 21, after "Sleeve" and before "of" change "101" to -- 10l --.
Line 22, after "folds" and before "are" change "401" to -- 40l --.
Line 23, after "Sleeve" and before "is" change "101" to -- 10l --.

Signed and Sealed this

Twenty-eighth Day of February, 2006

JON W. DUDAS
*Director of the United States Patent and Trademark Office*